(12) United States Patent
Dauginas et al.

(10) Patent No.: US 8,271,509 B2
(45) Date of Patent: *Sep. 18, 2012

(54) SEARCH AND CHAT INTEGRATION SYSTEM

(75) Inventors: Edward Patton Dauginas, Charlotte, NC (US); Constance Landreth James, Kannapolis, NC (US); Brooke Kathryn Monberg, Portland, ME (US); William C. A. Suayan, Fremont, CA (US); Wenxin Yu, Needham, MA (US)

(73) Assignee: Bank of America Corporation, Charlotte, NC (US)

( * ) Notice: Subject to any disclaimer, the term of this patent is extended or adjusted under 35 U.S.C. 154(b) by 426 days.

This patent is subject to a terminal disclaimer.

(21) Appl. No.: 12/274,951

(22) Filed: Nov. 20, 2008

(65) Prior Publication Data

US 2010/0125592 A1 May 20, 2010

(51) Int. Cl.
*G06F 17/30* (2006.01)
*G06F 3/00* (2006.01)
*G06Q 50/00* (2012.01)

(52) U.S. Cl. ........ 707/758; 707/798; 707/766; 707/767; 715/758; 705/304; 705/346

(58) Field of Classification Search .......... 707/705–710, 707/721, 726, 731, 732, 748, 920, 959, 758, 707/767, 766; 715/202–209, 259, 707, 750, 715/752, 758, 76; 705/26.43, 14.54, 14.73, 705/7.42, 42, 14.19, 304, 346; 709/215–220, 709/203–204; 704/8–10, 243

See application file for complete search history.

(56) References Cited

U.S. PATENT DOCUMENTS

| | | | |
|---|---|---|---|
| 5,958,014 | A | 9/1999 | Cave |
| 5,961,332 | A | 10/1999 | Joao |
| 6,099,319 | A | 8/2000 | Zaltman et al. |

(Continued)

FOREIGN PATENT DOCUMENTS

EP 0813175 12/1997

(Continued)

OTHER PUBLICATIONS

Siu Cheung Hui et al. "Text Mining for Chat Message Analysis", 2008 IEEE, pp. 411-416.*

(Continued)

*Primary Examiner* — Srirama Channavajjala
(74) *Attorney, Agent, or Firm* — Michael A. Springs; Moore & Van Allen, PLLC; W. Kevin Ransom

(57) ABSTRACT

Embodiments of the invention provide systems, methods, and computer program products for providing improved customer service by presenting a customer with an invitation to chat with a customer service associate that is skilled in a subject matter of interest to the customer and is currently available to chat with the customer. For example, in one embodiment, a system is provided having a communication interface configured to receive a search query from a consumer, such as an Internet search query entered into a search field of a web page. The system further comprises a processor operatively coupled to the communication interface and configured to compare information about the search query to one or more rules stored in a memory to determine whether a customer service associate skilled in an area related to the subject matter of the search query is currently available to chat with the consumer over, for example, the Internet.

27 Claims, 5 Drawing Sheets

U.S. PATENT DOCUMENTS

| | | | |
|---|---|---|---|
| 6,120,440 | A | 9/2000 | Goknar |
| 6,280,198 | B1 | 8/2001 | Calhoun et al. |
| 6,334,778 | B1 | 1/2002 | Brown |
| 6,349,290 | B1 | 2/2002 | Horowitz et al. |
| 6,564,244 | B1 * | 5/2003 | Ito et al. ............... 709/204 |
| 6,611,590 | B1 | 8/2003 | Lu et al. |
| 6,745,178 | B1 * | 6/2004 | Emens et al. ............ 707/741 |
| 6,842,877 | B2 | 1/2005 | Robarts et al. |
| 6,922,689 | B2 * | 7/2005 | Shtivelman ................ 1/1 |
| 7,090,582 | B2 | 8/2006 | Danieli |
| 7,243,078 | B1 * | 7/2007 | Lewis-Hawkins ........ 705/7.29 |
| 7,289,949 | B2 | 10/2007 | Warner et al. |
| 7,452,278 | B2 | 11/2008 | Chen et al. |
| 7,464,272 | B2 | 12/2008 | Danieli |
| 7,487,248 | B2 | 2/2009 | Moran et al. |
| 7,561,176 | B2 | 7/2009 | Westerfield et al. |
| 7,694,139 | B2 | 4/2010 | Nachenberg et al. |
| 7,802,110 | B2 | 9/2010 | Morais |
| 7,882,243 | B2 | 2/2011 | Ivory et al. |
| 2001/0054064 | A1 * | 12/2001 | Kannan ............... 709/203 |
| 2002/0059141 | A1 * | 5/2002 | Davies et al. ........... 705/42 |
| 2003/0013981 | A1 | 1/2003 | Gevins et al. |
| 2003/0059750 | A1 | 3/2003 | Bindler et al. |
| 2003/0069880 | A1 * | 4/2003 | Harrison et al. ........... 707/3 |
| 2003/0137544 | A1 * | 7/2003 | Mears et al. ............ 345/810 |
| 2003/0187641 | A1 * | 10/2003 | Moore et al. ............ 704/235 |
| 2003/0187925 | A1 * | 10/2003 | Inala et al. ............ 709/204 |
| 2004/0039776 | A1 * | 2/2004 | Ballard ................ 709/203 |
| 2004/0083366 | A1 | 4/2004 | Nachenberg et al. |
| 2004/0117383 | A1 * | 6/2004 | Lee et al. .............. 707/100 |
| 2004/0123109 | A1 | 6/2004 | Choi |
| 2004/0172358 | A1 * | 9/2004 | Lent et al. .............. 705/38 |
| 2004/0210159 | A1 | 10/2004 | Kibar |
| 2004/0224771 | A1 | 11/2004 | Chen et al. |
| 2005/0004864 | A1 * | 1/2005 | Lent et al. .............. 705/38 |
| 2005/0071481 | A1 | 3/2005 | Danieli |
| 2005/0079474 | A1 | 4/2005 | Lowe |
| 2005/0097320 | A1 | 5/2005 | Golan et al. |
| 2005/0113169 | A1 | 5/2005 | Danieli et al. |
| 2005/0132298 | A1 * | 6/2005 | Lueckhoff et al. ........ 715/758 |
| 2005/0187781 | A1 | 8/2005 | Christensen |
| 2005/0193055 | A1 | 9/2005 | Angel et al. |
| 2005/0227233 | A1 | 10/2005 | Buxton et al. |
| 2005/0245317 | A1 | 11/2005 | Arthur et al. |
| 2005/0288951 | A1 * | 12/2005 | Stone et al. .............. 705/1 |
| 2006/0014552 | A1 * | 1/2006 | Cunningham et al. ........ 455/466 |
| 2006/0047568 | A1 * | 3/2006 | Eisenberg et al. .......... 705/14 |
| 2006/0047958 | A1 | 3/2006 | Morais |
| 2006/0080130 | A1 * | 4/2006 | Choksi ................ 705/1 |
| 2006/0098624 | A1 | 5/2006 | Morgan et al. |
| 2006/0101098 | A1 | 5/2006 | Morgan et al. |
| 2006/0112126 | A1 | 5/2006 | Soto et al. |
| 2006/0150119 | A1 * | 7/2006 | Chesnais et al. .......... 715/810 |
| 2006/0229129 | A1 | 10/2006 | Jalava et al. |
| 2006/0287105 | A1 | 12/2006 | Willis |
| 2007/0004518 | A1 | 1/2007 | Friesen et al. |
| 2007/0087819 | A1 | 4/2007 | Van Luchene et al. |
| 2007/0130400 | A1 | 6/2007 | Reisman |
| 2007/0201679 | A1 * | 8/2007 | Baggenstoss et al. ... 379/265.06 |
| 2007/0245249 | A1 | 10/2007 | Weisberg |
| 2007/0265873 | A1 * | 11/2007 | Sheth et al. .............. 705/1 |
| 2007/0271618 | A1 | 11/2007 | Chao et al. |
| 2007/0282735 | A1 * | 12/2007 | Schuebert ............. 705/38 |
| 2008/0031458 | A1 | 2/2008 | Raja |
| 2008/0040419 | A1 | 2/2008 | Muth |
| 2008/0052377 | A1 | 2/2008 | Light |
| 2008/0072054 | A1 | 3/2008 | Choi |
| 2008/0091572 | A1 * | 4/2008 | Kraft et al. .............. 705/27 |
| 2008/0103920 | A1 | 5/2008 | Leach et al. |
| 2008/0104402 | A1 | 5/2008 | Gueron et al. |
| 2008/0108426 | A1 | 5/2008 | Nguyen et al. |
| 2008/0177659 | A1 * | 7/2008 | Lacey et al. ............. 705/42 |
| 2008/0288349 | A1 * | 11/2008 | Weisberg et al. .......... 705/14 |
| 2009/0064038 | A1 | 3/2009 | Fleischman et al. |
| 2009/0132812 | A1 | 5/2009 | Kobozev et al. |
| 2009/0182664 | A1 | 7/2009 | Trombley |
| 2009/0193079 | A1 * | 7/2009 | Gupta et al. ............. 709/204 |
| 2009/0228704 | A1 | 9/2009 | de Atley et al. |
| 2009/0235312 | A1 | 9/2009 | Morad et al. |
| 2009/0249074 | A1 | 10/2009 | Madhavan et al. |
| 2009/0259753 | A1 | 10/2009 | Hinton et al. |
| 2009/0264070 | A1 | 10/2009 | Lim |
| 2009/0276529 | A1 | 11/2009 | Ivory et al. |
| 2009/0285392 | A1 * | 11/2009 | Leitheiser et al. .......... 380/255 |
| 2010/0031042 | A1 | 2/2010 | Di Crescenzo et al. |
| 2010/0069892 | A1 | 3/2010 | Steinbach et al. |
| 2010/0070758 | A1 | 3/2010 | Low et al. |
| 2010/0121761 | A1 | 5/2010 | Allen et al. |
| 2010/0268771 | A1 | 10/2010 | Kulakowski et al. |
| 2010/0299731 | A1 | 11/2010 | Atkinson |

FOREIGN PATENT DOCUMENTS

| | | | |
|---|---|---|---|
| WO | WO 03/025776 A1 | | 3/2003 |
| WO | WO 2005/006226 | * | 1/2005 |
| WO | WO 2006004652 | * | 10/2006 |

OTHER PUBLICATIONS

Michelle M. Kazmer et al. "Identity in customer service chat interaction: Implications for virtual reference",Library & Information Science Research 29 (2007) 5-29.*

International Search Report and Written Opinion of the International Searching Authority mailed Feb. 4, 2010 for International Application No. PCT/US 09/64411.

Verizon Residential Support, High Speed Internet, "How does that chat feature work?" Accessed via the Internet on Apr. 10, 2012 at: http://www22.verizon.com/ResidentialHelp/HighSpeed/Email/Troubleshooting/QuestionsOne/86900.htm.

* cited by examiner

SEARCH AND CHAT INTEGRATION SYSTEM

FIELD

In general, embodiments of the invention relate to systems, methods, and computer program products for improving customer service. More specifically, embodiments of the invention relate to receiving a search query from a customer and, based at least partially thereon, opening a chat session between the customer and a customer service associate.

BACKGROUND

One of the major frustrations customers have with businesses is the difficulty, or even inability, to directly engage its customer service representatives when needed. For example, many customers complain about the difficulty in trying to speak to an actual customer service associate over the phone. Others complain that their letters to customer service associates are returned too late or never returned at all. Still others complain about unhelpful business websites and the difficulty in finding information relevant to their problems on those sites. As a result of these and other experiences, customers may become frustrated, patronize the business less, or even stop patronizing it altogether.

Accordingly, it would be desirable if a system, method, or computer program product could be provided that would help address customers' problems more expeditiously. Preferably, the system, method, or computer program product would help customer service associates directly engage customers early in the service experience, in order to help prevent the customer from losing interest in the business and help prevent the business from losing the customer.

BRIEF SUMMARY OF EMBODIMENTS OF THE INVENTION

Embodiments of the invention provide systems, methods, and computer program products for providing improved customer service by presenting a customer with an invitation to chat with a customer service associate who is skilled in a subject matter of interest to the customer and is currently available to chat with the customer. For example, in one embodiment, a system is provided having a communication interface configured to receive a search query from a consumer, such as an Internet search query entered into a search field of a web page. The system further comprises a processor operatively coupled to the communication interface and configured to compare information about the search query to one or more rules stored in a memory to determine whether a customer service associate skilled in an area related to the subject matter of the search query is currently available to chat with the consumer over, for example, the Internet.

For example, one embodiment of the invention provides a system comprising a communication interface and a processor operatively coupled to the communication interface. The communication interface is configured to receive a search query from a user. The processor is configured to facilitate a chat session based on a comparison of information about the search query to a rule. In one embodiment of the system, the information about the search query comprises the search query itself. In one embodiment, the chat session comprises substantially real-time electronic communication between, for example, the user and a chat agent. In one embodiment, the rule relates at least partially to whether the chat agent is skilled in a subject matter related to the search query. In one embodiment, the rule relates at least partially to whether the chat agent is currently available to chat. In one embodiment, the processor is further configured to initiate a search using the search query. The search query may involve a request to search at least a portion of the Internet.

In one embodiment, the system further includes a memory device operatively coupled to the processor and comprising the rule stored therein. In such an embodiment, the processor is configured to compare the information about the search query with the rule, and to determine whether there exists a chat agent skilled in a subject matter related to the user-initiated search query based at least partially on a comparison of the information about the search query with the rule. In another embodiment, the processor is configured to compare the information about the search query with the rule, and to determine whether a chat agent skilled in a subject matter related to the user-initiated search query is currently available to chat based at least partially on a comparison of the information about the search query with the rule.

Embodiments of the invention further provide a system having a communication interface configured to receive information about a user-initiated search query, and a processor operatively coupled to the communication interface and configured to determine whether there exists a chat agent skilled in a subject matter related to the user-initiated search query. In one embodiment, the processor is further configured to determine whether the chat agent skilled in a subject matter related to the user-initiated search query is currently available to chat. In one embodiment, the processor is further configured to use the communication interface to communicate information about whether there exists a chat agent in a subject matter related to the user-initiated search query to another device.

In one embodiment, the system includes a memory device operatively coupled to the processor and comprising a chat agent skill set. In such an embodiment, the processor is configured to compare the information about a user-initiated search query with the chat agent skill set. The processor is then further configured to determine whether there exists a chat agent skilled in a subject matter related to the user-initiated search query based at least partially on a comparison of the information about a user-initiated search query with the chat agent skill set. In one such embodiment, the memory device provides a substantially real-time representation of at least a portion of the chat agent skill set.

In one embodiment, the system includes a memory device operatively coupled to the processor and comprising a chat agent availability. In such an embodiment, the processor is configured to compare the information about a user-initiated search query with the chat agent availability. The processor is then configured to determine whether a chat agent skilled in a subject matter related to the user-initiated search query is available to chat based at least partially on a comparison of the information about a user-initiated search query with the chat agent availability. In one such embodiment, the memory device provides a substantially real-time representation of at least a portion of the chat agent availability.

In one embodiment, the system includes a memory device operatively coupled to the processor and comprising a list of subject matters. In one such embodiment, the processor is configured to determine a subject matter that the search query is related to and compare the subject matter to the list of subject matters. The processor is then configured to determine whether there exists a chat agent skilled in a subject matter related to the user-initiated search query based at least partially on a comparison of the subject matter to the list of subject matters.

In one embodiment of the system, the processor is configured to initiate a chat between a chat agent and the user if the processor determines that there exists a chat agent skilled in a subject matter related to the user-initiated search query. The processor may be configured to initiate the chat by communicating with a chat system configured to send an invitation to the user to join the chat. The processor may be configured to initiate the chat by sending a chat message to a user terminal. The processor may be configured to initiate the chat by sending a chat vendor client to a user terminal, wherein the chat vendor client is configured to contact a chat vendor.

In one embodiment of the system, the processor is configured to determine whether there exists a chat agent skilled in a subject matter related to the user-initiated search query by comparing the received information about the user-initiated search query to a rule and communicating with a comparison system based on a comparison of the received information about the user-initiated search query to the rule.

In some embodiments, the information about the user-initiated search query comprises the user-initiated search query, and, in some embodiments, the information about the user-initiated search query comprises information about the subject matter of the user-initiated search query. In one embodiment, the communication device is configured to receive the information about the user-initiated search query from a user terminal. In one embodiment, the communication device is configured to receive the information about the user-initiated search query from a search front end system.

In some embodiments of the system, the processor is further configured to initiate a search using the information received about the user-initiated search query. In one embodiment, the search comprises a search of materials on at least a portion of the Internet. In one embodiment, the processor is further configured to use the communication interface to communicate results of the search to a user terminal.

Embodiments of the invention further provide a customer service system having a server configured to provide a web page having a search field, said search field allowing a user to enter a search query. The system further includes a processing device configured to provide the user with an invitation to chat with a particular customer service associate based on the search query entered into the search field. For example, in one embodiment, the processing device is configured to receive the search query, determine the subject matter of the search query, and determine whether a customer service associate specializing in the subject matter of the search query is currently available to chat with the user.

Embodiments of the invention further provide a system for directing a user to a chat session with a chat agent, the system including a device configured to receive a search query from the user, return a search result to the user based at least partially on the search query, compare the search query to a rule, and present the user with a path to the chat session based at least partially on a comparison of the search query to the rule. In some embodiments, the rule relates at least partially to whether there exists a chat agent skilled in a subject matter related to the search query. In some embodiments, the rule relates at least partially to whether the chat agent is available to chat.

Embodiments of the invention further provide a method of directing a user to a chat session. In one embodiment, the method includes: (1) receiving a search query from a user via a computer apparatus; (2) comparing the search query to information stored in a memory of a computer apparatus; and (3) using a computer apparatus to present to the user a path to a chat session based at least partially on a comparison of the search query to the information stored in the memory. In some embodiments, the method further involves returning a search result to the user using a computer apparatus, said search result comprising information related to the search query. In some embodiments, the method further involves performing a search using a computer apparatus, said search comprising a search for information related to the search query. In some embodiments, the chat session comprises substantially real-time communication between the user and a chat agent.

In some embodiments of the method, comparing the search query to information stored in a memory of a computer apparatus involves: (1) comparing information about the search query to information about a chat agent skill set; and (2) determining whether there exists a chat agent skilled in a subject matter related to the search query based at least partially on a comparison of the information about the search query with the information about the chat agent skill set. In some embodiments of the method, comparing the search query to information stored in a memory of a computer apparatus involves: (1) comparing information about the search query to substantially real-time information about chat agent availability; and (2) determining whether there a chat agent is currently available to chat with the user based at least partially on a comparison of information about the search query to the substantially real-time information about chat agent availability.

Embodiments of the invention further provide a computer program product for providing customer service, where the computer program product includes a computer-readable storage medium having computer-readable program code portions stored therein. In one embodiment, the computer-readable program code portions include: (1) a search portion configured for receiving a search query from a customer and returning a search result to the customer based at least partially on the search query; (2) a chat portion configured for facilitating a chat session, the chat session comprising substantially real-time electronic communication between the customer and a customer service associate; and (3) a comparison portion configured for comparing the search query to a rule and presenting the customer with a path to the chat session based at least partially on a comparison between the search query and the rule. In some embodiments, the rule is based at least partially on whether a subject matter of the search query at least partially relates to a skill set of a customer service associate. In some embodiments the rule is further based at least partially on customer service associate availability.

BRIEF DESCRIPTION OF THE DRAWINGS

Figure 1:
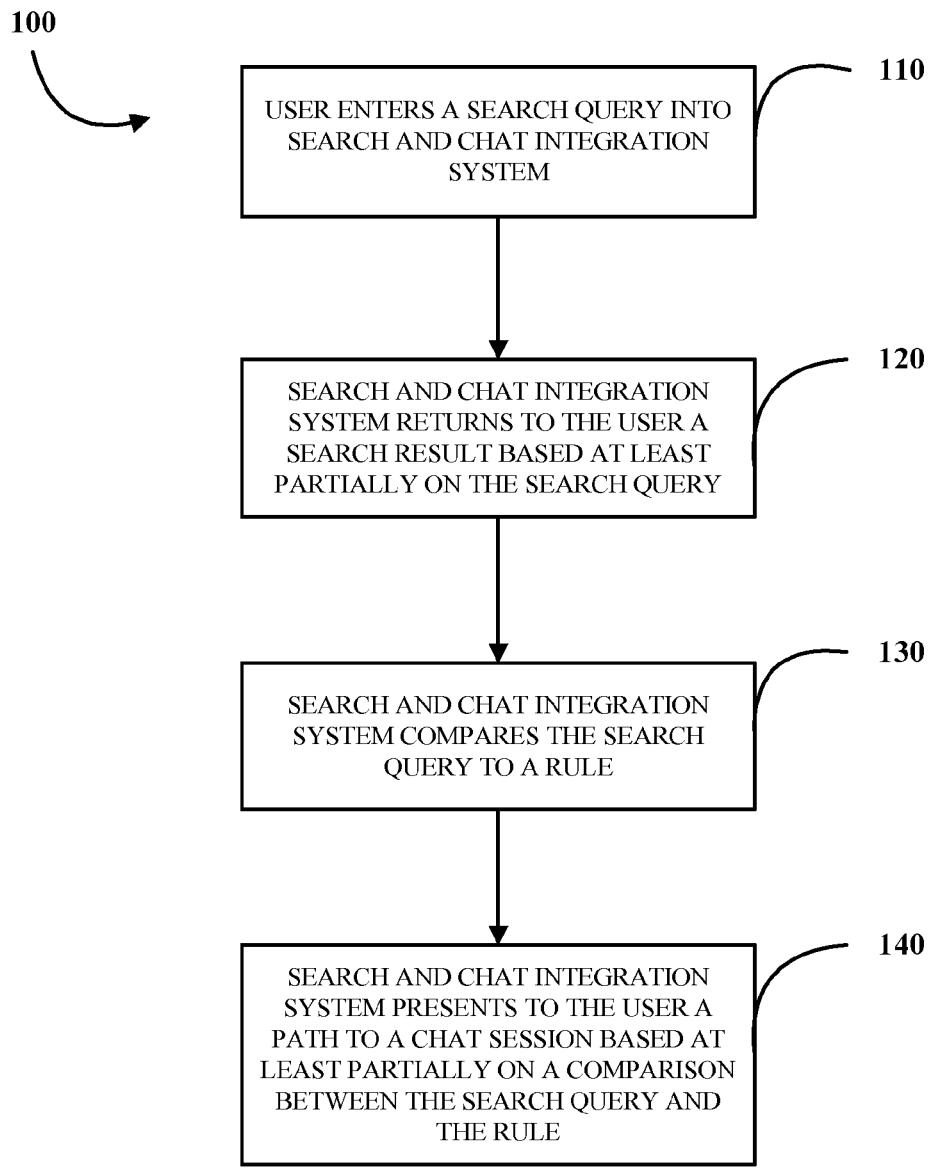
Figure 2:
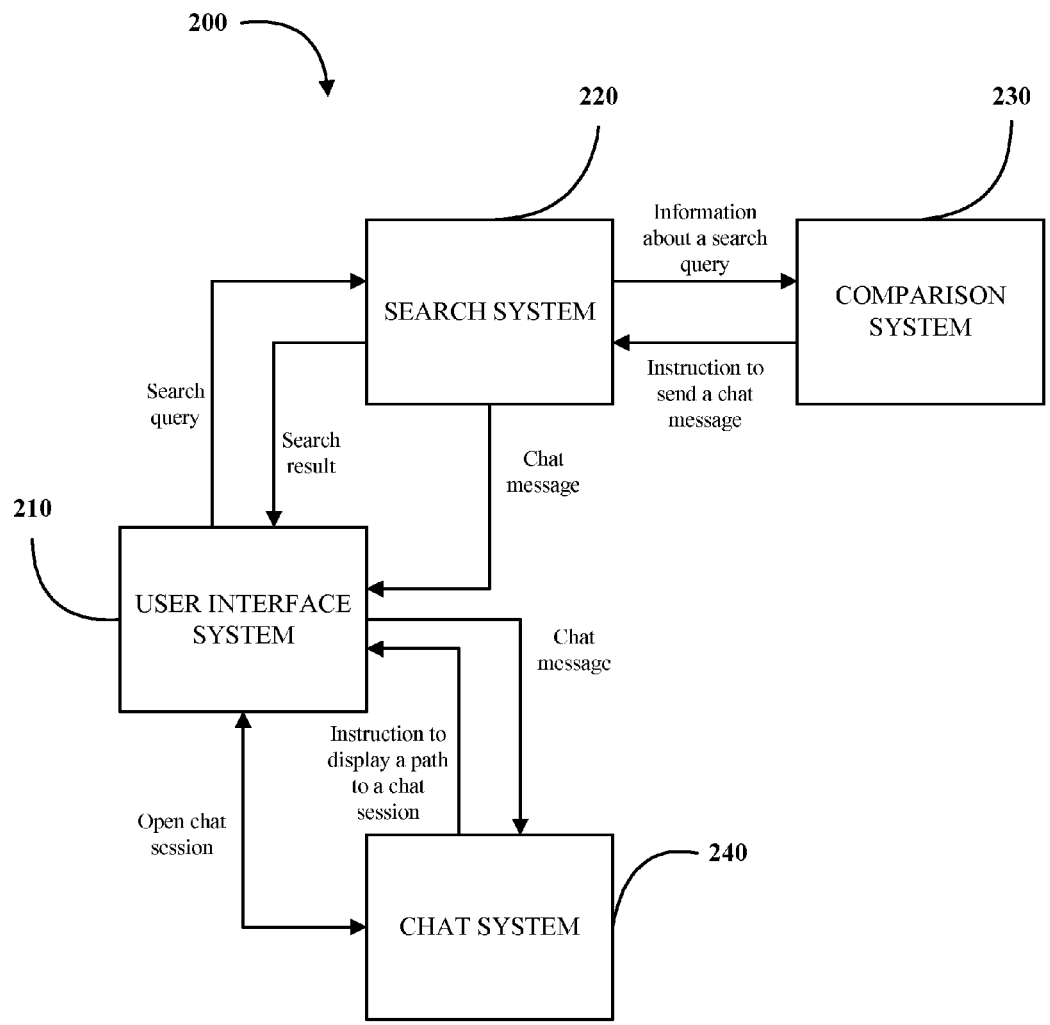
Figure 3:
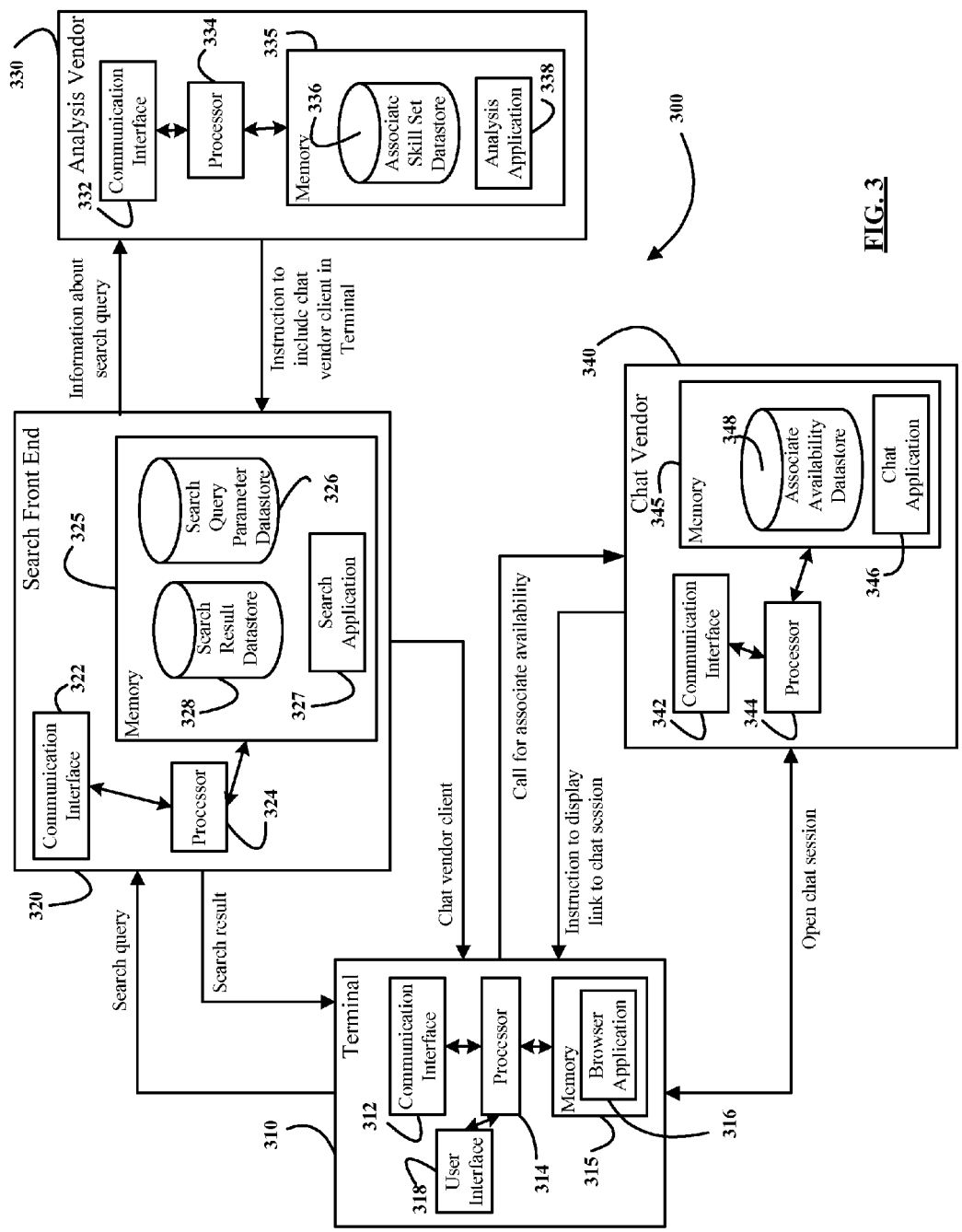
Figure 4:
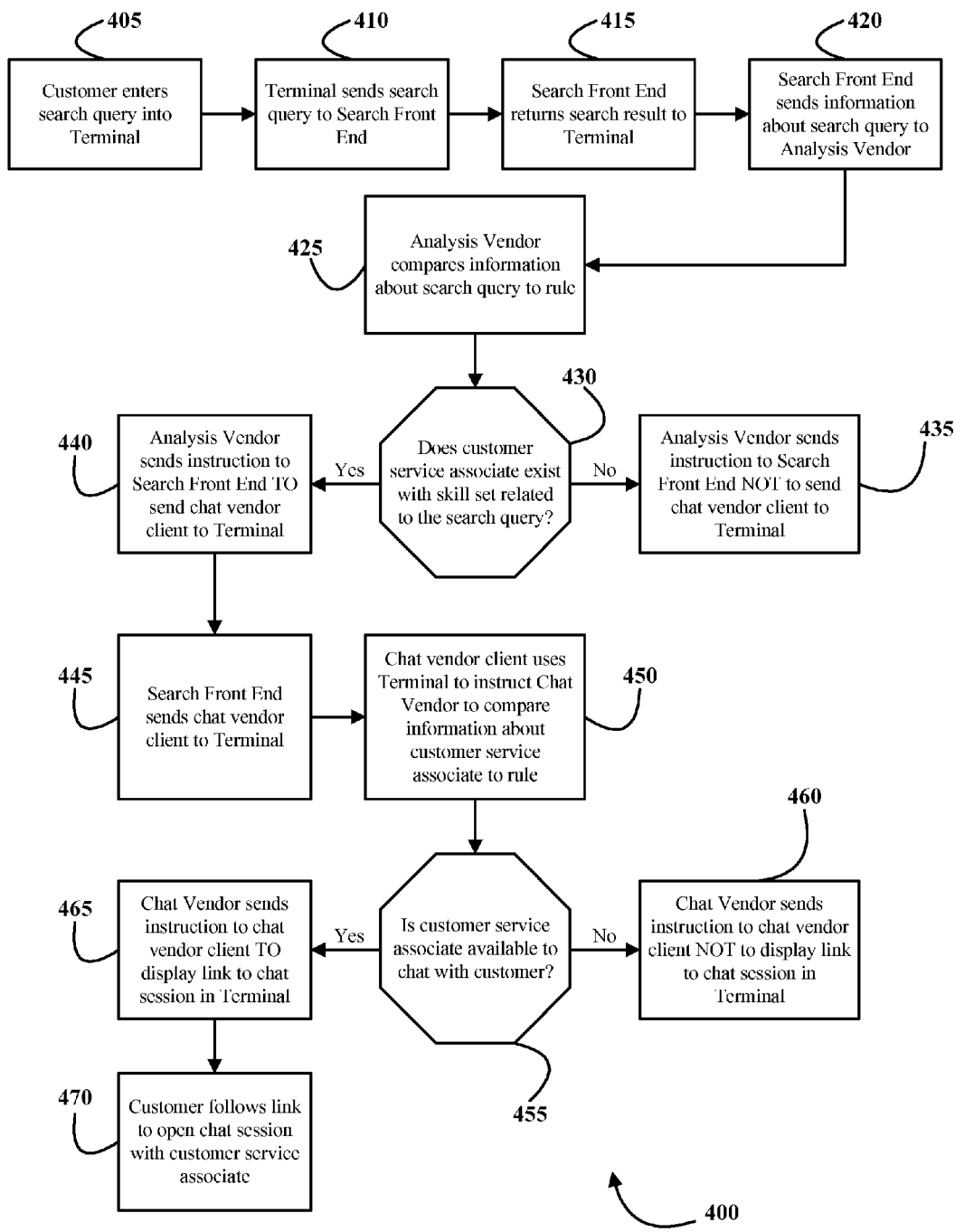
Figure 5:
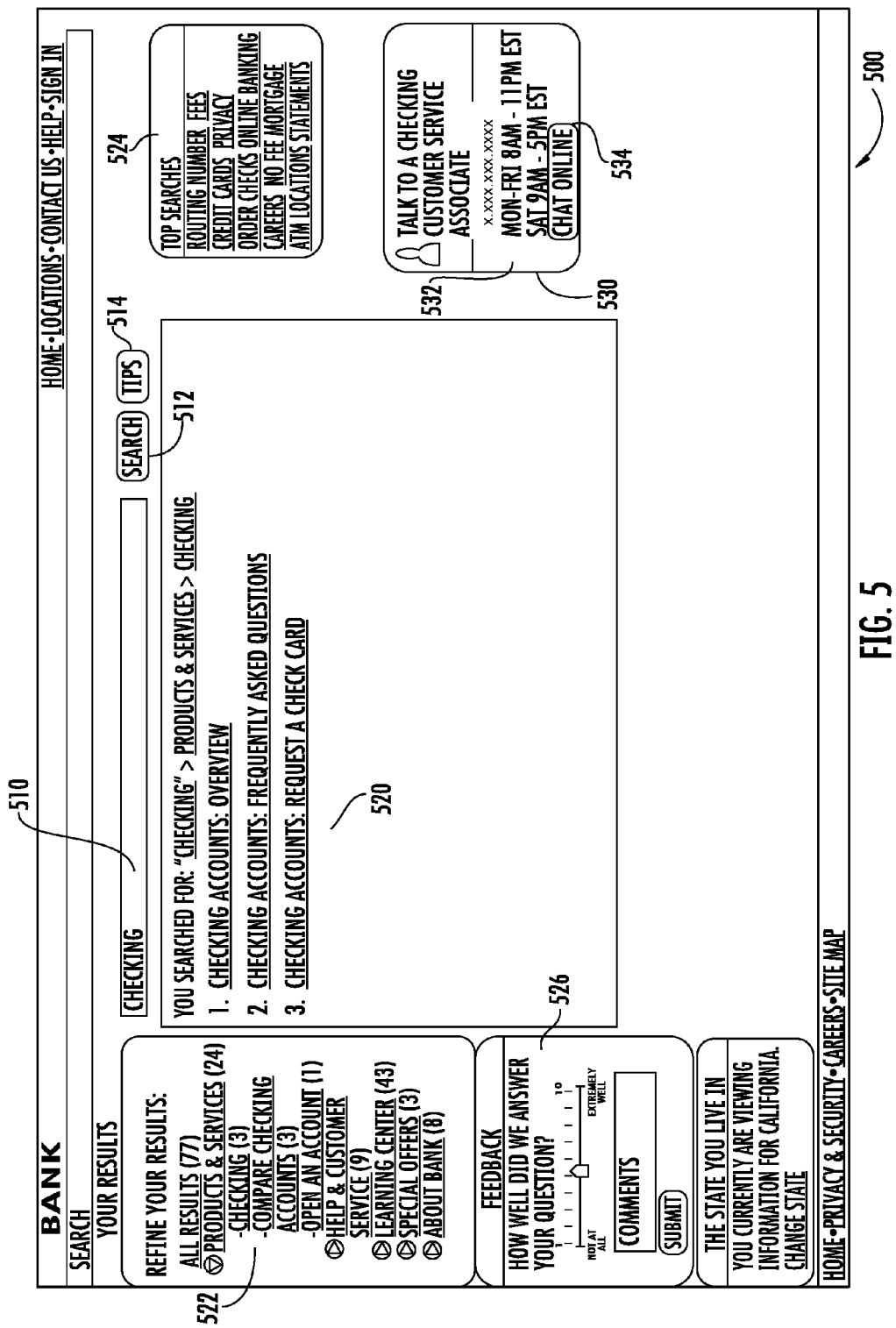

Having thus described embodiments of the invention in general terms, reference will now be made to the accompanying drawings, which are not necessarily drawn to scale, and wherein:

FIG. 1 is a flow diagram illustrating the general process flow of a Search and Chat Integration System, in accordance with an embodiment of the present invention;

FIG. 2 is a block diagram illustrating high-level components of a Search and Chat Integration System, in accordance with an embodiment of the present invention;

FIG. 3 is a block diagram illustrating the components of a Search and Chat Integration System, in accordance with an embodiment of the present invention;

FIG. 4 is a flow diagram illustrating the general process flow of a Search and Chat Integration System, in accordance with an embodiment of the present invention; and FIG. 5 illustrates an exemplary graphical user interface displayed on a user terminal in the Search and Chat Integration System, in accordance with an embodiment of the present invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form, and vice versa. Also, as used herein, the term "a" shall mean "one or more," even though the phrase "one or more" is also used herein. Like numbers refer to like elements throughout.

Although some of the embodiments of the invention described herein are generally described as involving a "bank," one of ordinary skill in the art will appreciate that other embodiments of the invention may involve other businesses or financial institutions that take the place of or work in conjunction with the bank to perform one or more of the processes or steps described herein as being performed by a bank.

As will be appreciated by one of skill in the art, the present invention may be embodied as a method, system, computer program product, or a combination of the foregoing. Accordingly, embodiments of the present invention may take the form of an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-readable storage medium having computer-readable program code/computer-readable instructions embodied in the medium.

Any suitable computer-readable medium may be utilized. The computer-readable medium may be, for example but not limited to, an electronic, magnetic, optical, electromagnetic, infrared, or semiconductor system, apparatus, or device. For example, in one embodiment, the computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or other tangible optical or magnetic storage device. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in computer memory.

Computer program code/computer-readable instructions for carrying out operations of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 provides an exemplary flow diagram illustrating the general process flow 100 of a Search and Chat Integration System, in accordance with an embodiment of the present invention. As represented by block 110, a user first enters a search query into a Search and Chat Integration System, which then, as represented by block 120, returns a search result to the user based at least partially on the search query. As represented by blocks 130 and 140, the Search and Chat Integration System is also configured to compare the search query to a rule and present to the user a path to a chat session based at least partially on the comparison between the search query and the rule.

The order of the processes described in blocks 120, 130, and 140 in FIG. 1 is merely exemplary and may vary. For example, the Search and Chat Integration System may compare the search query to a rule before, after, or substantially simultaneous with returning a search result to the user. As another example, the Search and Chat Integration System may present to the user a path to a chat session before, after, or substantially simultaneous with returning a search result to the user. Likewise, the above use of the singular form for search query, rule, and search result is for simplicity only and is not meant to be limiting there or anywhere else herein. Indeed, the various embodiments of the Search and Chat Integration System described herein are capable of receiving one or more search queries, returning one or more search results, and comparing one or more search queries to one or more rules.

FIG. 2 provides a Search and Chat Integration System 200, including a User Interface System 210, Search System 220, Comparison System 230, and Chat System 240. User Interface System 210 is operatively coupled to Search System 220 and Chat System 240. Search System 220 is operatively coupled to User Interface System 210 and Comparison System 230. Comparison System 230 is operatively coupled to Search System 220. Chat System 240 is operatively coupled to User Interface System 210.

User Interface System 210 is configured to send a search query, receive a search result based at least partially on a search query, receive a chat message, send a chat message, receive an instruction to display a path to a chat session, and facilitate opening a chat session. Search System 220 is configured to receive a search query, send information about a search query, receive an instruction to send a chat message, send a chat message, and send a search result based at least partially on a search query. Comparison System 230 is configured to receive information about a search query and send an instruction to send a chat message. Chat System 240 is configured to receive a chat message, send an instruction to display a path to a chat session, and facilitate opening a chat session between a user and a chat agent.

In one embodiment of the invention, Search and Chat Integration System 200 is configured to perform the processes illustrated in FIG. 1. Accordingly, the user enters a search query into User Interface System 210, which is then sent to Search System 220. Search System 220 receives the search query, performs a search, and returns a search result to User Interface System 210 based at least partially on the search query. The User Interface System 210 then presents the search result to user. Search System 220 also sends information about the search query to Comparison System 230, where the information is compared to a rule. Based at least partially on the comparison of the information about the search query to the rule, Comparison System 230 sends an instruction to Search System 220 to send a chat message to User Interface System 210. After receiving the chat message, User Interface System 210 forwards the chat message to Chat System 240. After receiving the chat message, Chat System 240 sends back to User Interface System 210 an instruction to present the user with a path to a chat session. Once the path is presented to the user by the User Interface System 210, the user follows the path and a chat session between User Interface System 210 and Chat System 240 is opened.

The order of the processes described in FIG. 2 is merely exemplary and may vary. For example, Search System 220 may return a search result to User Interface System 210 before, after, or substantially simultaneous with Search System 220 sending a chat message to User Interface System 210. As another example, Chat System 240 may send to User Interface System 210 an instruction to display a path to a chat session before, after, or substantially simultaneous with Search System 220 sending a search result to User Interface System 210.

Additionally, although FIG. 2 describes one particular way of sending a chat message from Search System 220 to Chat System 240 via User Interface System 210, other embodiments of the invention may involve a different system and method for sending a chat message to the Chat System 240. For example, Search System 220 may send a chat message directly to Chat System 240, which then sends to User Interface System 210 via Search System 220 an instruction to display a path to a chat session. Alternatively, Search Entity 220 may send a chat message directly to Chat Entity 240, which then sends an instruction to display a path to a chat session directly to User Interface System 210. In still another exemplary embodiment, Comparison System 230 sends a chat message directly to Chat System 240, which then sends to User Interface System 210, directly or via Search System 220, an instruction to display a path to a chat session.

Although FIG. 2 depicts the User Interface System 210, Search System 220, Comparison System 230, and Chat System 240 as separate systems, the systems may or may not be performed by different hardware, software, or entities. For example, in one embodiment, some or all of these systems may be combined into a single system using the same software and/or hardware, i.e. Search System 220 and Comparison System 230 may be portions of a single Search and Comparison System configured to receive a search query, send a search result based at least partially on the search query, compare the search query to a rule, and send a chat message based at least partially on the comparison of the search query to the rule. In other embodiments, each system has its own hardware and/or software and does not share its hardware and/or software with the other systems. In some embodiments, some or all of the systems in the Search and Chat Integration System 200 may be separated into two or more distinct entities, i.e. Chat System 240 may be separated into a Chat Message System configured to communicate with User Interface System 210, and a Chat Session System configured to open a chat session between itself and User Interface System 210, where each system uses different hardware and/or software to perform their respective functions.

In addition, the system illustrated in FIG. 2 may be controlled, operated, maintained, etc. (hereinafter "maintained") by the same or separate parties. For example, a user may maintain the User Interface System 210, a bank or its agent may maintain the Search System 220 and the Comparison System 230, and a third party vendor may maintain the Chat System 240. As another example, a bank may maintain the entire Search and Chat Integration System 200, including User Interface System 210, Search System 220, Comparison System 230, and Chat System 240.

Referring now to FIGS. 3 and 4, an exemplary Search and Chat Integration System 300 and flow diagram 400 are provided to provide a more detailed description of one exemplary embodiment of the invention. The system and process described in FIGS. 3 and 4 are directed at integrating search applications with chat applications to improve customer service. For example, a bank customer may enter the word "mortgage" into a search field of the bank's website that incorporates the Search and Chat Integration System 300 and performs the steps in the flow diagram 400. In addition to processing the search query and producing a list of relevant search results, the Search and Chat Integration System 300 and the process described in the flow diagram 400 also invite the customer to join a chat session with one of the bank's mortgage specialists if one is available. By integrating the search and chat features of its website, the bank presents its customers with the opportunity to speak directly to a customer service associate much earlier in the process.

It should be noted that the term "customer," as described in many of the embodiments herein, means a person or business that is a past, current, or potential customer of a bank. However, in other embodiments of the present invention, the term "customer," as well as the term "user," may include any person, association, machine, apparatus, and/or any other thing capable of using a Search and Chat Integration System.

Likewise, the term "customer service associate," as described in many of the embodiments herein, means a customer service representative of a bank capable of participating in a chat session with a past, current, or potential customer of the bank. However, in other embodiments of the present invention, the term "customer service associate," as well as the term "chat agent," may include any person, association, machine, apparatus, and/or any other thing capable of participating in a chat session.

Referring now specifically to FIG. 3, a Search and Chat Integration System 300 is provided, which includes a Terminal 310, Search Front End 320, Analysis Vendor 330, and Chat Vendor 340. The systems that make up the Search and Chat Integration System 300 may be communicatively coupled with one or more networks. The network(s) linking the Terminal 310, Search Front End 320, Analysis Vendor 330, and/or Chat Vendor 340 to one another may include a local area network (LAN), a wide area network (WAN), and/or a Global Area Network (GAN), such as the Internet. The networks may comprise wireless and/or wireline technology.

The Terminal 310 is operatively coupled to the Search Front End 320 and the Chat Vendor 340, and may include, for example, a personal computer system, a mobile phone, a personal digital assistant, a public kiosk, or other type of computing device. As illustrated, the Terminal 310 comprises a Communication Interface 312, Processor 314, Memory 315 having a Browser Application 316, and User Interface 318.

The Communication Interface 312, like all other communication interfaces described herein, is comprised of hardware, and, in some instances, software, that enables one portion of the Search and Chat Integration System 300, such as Terminal 310, to transport, send, receive, or otherwise communicate information to and/or from the communication interface of another portion of the Search and Chat Integration System 300. For example, the communication interface 312 may include a modem, server, or other electronic device that communicatively couples the Terminal 310 to another electronic device, such as the electronic devices that make up the Search Front End 320, the Analysis Vendor 330, the Chat Vendor 340, and/or one or more networks linking the Terminal 310 to these other portions of the Search and Chat Integration System 300.

The Processor 314, like all other processors described herein, includes circuitry required for implementing audio, visual, and/or logic functions of the Terminal 310. For example, the Processor 314 may be comprised of a digital signal processor device, a microprocessor device, and various analog-to-digital converters, digital-to-analog converters, and other support circuits. Control and signal processing functions of the Terminal 310 are allocated between these devices according to their respective capabilities. The Processor 314 may include functionality to operate one or more software programs based on computer-readable instructions thereof, which may be stored in the Terminal's Memory 315, such as the Browser Application 316.

The Browser Application 316 may be any computer-readable instructions configured to allow the terminal to communicate with other devices over a network using, for example, one or more network or system communication protocols. For example, in one embodiment the Browser Application 316 comprises an Internet Web browser used by the Terminal 310 for sending a search query, receiving and displaying a search result, and facilitating a chat session.

The Memory 315 for storing the Browser Application 316 and other data, like the other memory devices described herein, may include any computer-readable medium. For example, the Memory 315 may include volatile memory, such as volatile Random Access Memory (RAM) including a cache area for the temporary storage of data. The Memory 315 may also include other non-volatile memory, which can be embedded and/or may be removable. The non-volatile memory can additionally or alternatively comprise an EEPROM, flash memory, or the like. The Memory 315 is communicatively coupled to the Processor 314 and can store any of a number of pieces of information and data used by the Terminal 310 to implement the functions of the Terminal 310.

The User Interface 318 is operatively coupled to the Processor 314 and generally comprises one or more user output devices, such as a display and/or speaker, for presenting information to a customer. The User Interface 318 further comprises one or more user input devices, such as one or more keys or dials, a touch pad, touch screen, mouse, microphone, camera, and/or the like, for receiving information from the customer.

FIG. 3 also illustrates the Search Front End 320 in accordance with an embodiment of the invention. In the illustrated embodiment, the Search Front End 320 is operatively coupled to the Terminal 310 and the Analysis Vendor 330 via a network such as the Internet. As illustrated, the Search Front End 320 comprises a Communication Interface 322, Processor 324, and Memory 325. In one embodiment, the Communication Interface 322 comprises a Web server.

The Memory 325 generally comprises a Search Application 327. The Search Application 327 comprises computer-readable instructions that generally instruct the Processor 324 to initiate a search of a set of resources, such as the Web generally or a particular institution's website, using the search query provided by the Terminal 310. The Search Application 327 may initiate the search by performing the search itself or by requesting that an external entity conduct the search. The search may be performed by actually searching all of the set of resources for the keywords from the search query or by comparing the search query to an index generated from a web/website crawler. The Memory 325 further includes a Search Result Datastore 328 for storing the search results at least temporarily as the search results are being compiled by the Search Application 327 and communicated to the Terminal 310. For example, in one embodiment, in response to the search query "mortgage" the Search Front End 320 is configured to return to the Terminal 310 one or more links to web pages related to mortgages.

The Search Application 327 also comprises computer-readable instructions configured to instruct the Processor 324 to forward information about the customer's search query to the Analysis Vendor 330 so that the Analysis Vendor 330 can use the information to determine if the customer should be presented with a link to a chat session with a customer service associate. In one embodiment, the information about the customer's search query that is sent from the Search Front End 320 to the Analysis Vendor 330 is the customer's search query itself. In other embodiments, however, the information about the customer's search query comprises other information related to the customer's search query, such as synonyms or common modifiers of the customer's search terms, in addition to or as an alternative to the customer's search query. In this regard, the Search Application 327 may be configured to compare the customer's search query to one or more rules stored in a Search Query Parameter Datastore 326 to determine if other information should be sent to the Analysis Vendor 330 along with or instead of the customer's search query. For example, in one embodiment, where the customer's search query includes the keyword "refinance," the Search Application 327 is configured to instruct the Processor 324 to add the identifier "mortgage" to the search query "refinance" and send both terms along to Analysis Vendor 330. In some embodiments of the invention, the information about the search query includes information about the results of the search in addition to or as an alternative to the customer's actual search query.

Further, FIG. 3 depicts the Analysis Vendor 330, which is operatively coupled to the Search Front End 320, in accordance with an embodiment of the invention. As illustrated, the Analysis Vendor 330 comprises a Communication Interface 332, a Processor 334, and a Memory 335 comprising an Associate Skill Set Datastore 336 and an Analysis Application 338. The Analysis Application 338 includes computer-readable instructions for instructing the Processor 334 to compare information about the search query to a rule associated with customer service associate skills and communicate the result of that comparison to the Search Front End 320. In this regard, the Associate Skill Set Datastore 336 includes a rule used by the Analysis Application 338 to identify in which subject areas an associate may be available to chat with the customer and determine which types of search query information indicates a demand for a chat in which available subject matters. For example, in one embodiment, the Analysis Application 338 is configured to instruct the Processor 334 to compare the search query identifier "mortgage" to a list of existing customer service associates to determine whether any of those associates are capable of answering questions relating to mortgages in a chat session. If the Processor 334 determines from this comparison that an associate suitable to chat with the customer is available, the Analysis Application 338 instructs the Processor 334 to send an instruction to the Search Front End 320 to include a chat vendor client in the Browser Application 316, including an instruction about a particular type of customer service associate needed to chat with the customer. Although this example is directed towards comparing information about the search query to customer service associate skill sets, any other rule or rules related to a chat session may be used instead.

FIG. 3 also illustrates a Chat Vendor 340, which is operatively coupled to the Terminal 310, in accordance with an embodiment of the invention. As illustrated, the Chat Vendor 340 comprises a Communication Interface 342, Processor 344, and Memory 345, where the Memory 345 includes a Chat Application 346 and an Associate Availability Datastore 348. The Chat Application 346 includes computer-readable instructions for comparing information about particular customer service associates to a rule associated with those customer service associates' availability and communicating the result of that comparison to Terminal 310. For example, in one embodiment, the Chat Vendor 340 receives a call from a chat vendor client in the Browser Application 316 to check the availability of any customer service associate capable of answering questions relating to mortgages in a chat session. In such a situation, the Chat Application 346 instructs the Processor 344 to review the Associate Availability Datastore 348 to confirm that one or more customer service associates skilled in answering questions about mortgages are available. The Processor 344 then instructs the chat vendor client to display a link to a chat session in Browser Application 316. Although this example is directed towards checking the availability of particular customer service associates, any other rule or rules related to a chat session may be used instead.

As mentioned above, Search and Chat Integration System 300 is, in one embodiment of the present invention, configured to perform the general process flow 400 illustrated in FIG. 4. Accordingly, as represented by block 405, a customer initiates the process flow 400 by using the User Interface 318 to enter a search query into the Terminal 310. For example, in one embodiment, the customer uses the Browser Application 316 in conjunction with the User Interface 318 to access a website that allows the customer to enter search terms and search strings into a search field. In one embodiment, the website is the website of a particular institution, such as the website of a bank or other financial institution, and/or the search is a search of only the particular institution's website. In still other embodiments, the website is the website of a more general web searching institution and/or the search is a search of the web generally.

Thereafter, the Terminal 310 uses the Browser Application 316 in connection with the Communication Interface 312 to send the search query to the Search Front End 320, as represented by block 410 in FIG. 4. The Search Front End 320 performs a search based at least partially on the search query and uses its Communication Interface 322 to return a search result to the Terminal 310, as represented by block 415. The Terminal 310 then uses the Browser Application 316 and the User Interface 318, such as a display device, to present the search results to the customer. As described herein, in one embodiment, the search results comprise one or more web pages, online documents, webcasts, or other resources available to the customer and related to the customer's search query.

In addition to producing a search result, the Search Front End 320 also generates information about the search query based on certain keywords or other parameters and sends this information to the Analysis Vendor 330, as represented by block 420. As described above, in one embodiment, the information generated by the Search Front End 320 includes synonyms or common modifiers of one or more of the search terms or phrases in the customer's search query. These synonyms or modifiers are, in one embodiment, determined by the Search Application 327 comparing the customer's search query to information and rules in the Search Query Parameter Datastore 326.

The Analysis Vendor 330 then compares the information about the search query to a rule in the Associate Skill Set Datastore 336, as represented by block 425. Although it may relate to something else, the rule, as shown by block 430 in FIG. 4, relates to whether any customer service associate has a skill set related to the subject matter of the search query. In one embodiment, the Associate Skill Set Datastore 336 provides a substantially real-time representation of the skill sets for each customer service associate. Thus, when Analysis Vendor 330 compares the subject matter of the search query to the information in Associate Skill Set Datastore 336, the results of the comparison are substantially current.

If no customer service associate exists with the relevant skill set, the Analysis Vendor 330 notifies the Search Front End 320 accordingly. In the embodiment illustrated in FIG. 4, the Analysis Vendor 330 instructs the Search Front End 320 not to send a chat vendor client to Terminal 310, as represented by block 435. In another embodiment, however, the Analysis Vendor 330 may be configured to not send anything at all to the Search Front End 320 if no customer service associate exists with a skill set related to the search query. In still another embodiment, if the Analysis Vendor 330 determines that no customer service associate has a skill set related to the search query, a default customer service associate involved in serving customers generally is selected.

On the other hand, if one or more customer service associates with a skill set related to the search query do exist, the Analysis Vendor 330 notifies the Search Front End 320 accordingly. In FIG. 4, the Analysis Vendor 330 notifies the Search Front End 320 of the type of customer service associate selected and instructs the Search Front End 320 to send a chat vendor client to the Terminal 310, as represented by block 440. In another embodiment, however, the Analysis Vendor 330 may be configured to send a chat vendor client directly to the Terminal 310 instead of sending an instruction to the Search Front End 320. Further, although a chat vendor client configured to communicate with the Chat Vendor 340 from the Terminal 310 is described herein, other methods for communicating with the Chat Vendor 340 may be used. For example, after being notified by the Analysis Vendor 330 of the existence of a customer service associate having a skill set related to the customer's search query, the Search Front End 320 may instead send a chat message with that information directly to the Chat Vendor 340.

As represented by block 445, after being instructed by the Analysis Vendor 330, the Search Front End 320 sends a chat vendor client to the Terminal 310. The chat vendor client then instructs the Chat Vendor 340 to compare information about the customer service associate identified by the Analysis Vendor 330 to a rule in the Associate Availability Datastore 348, as represented by block 450. Although it may relate to something else in other embodiments of the present invention, the rule, as shown by block 455 in FIG. 4, relates to whether the customer service associate having a skill set related to the search query is available to chat with the customer. In one embodiment, the Associate Availability Datastore 348 provides a substantially real-time representation of when each customer service associate is available to chat. Thus, when Chat Vendor 340 compares information about the customer service associate identified by the Analysis Vendor 330 to the information in Associate Availability Datastore 348, the results of the comparison are substantially current.

If no customer service associate having the relevant skill set is currently available to chat, the Chat Vendor 340 notifies the Terminal 310 accordingly. In FIG. 4, the Chat Vendor 340 instructs the chat vendor client not to display a link to a chat session in Terminal 310, as represented by block 460. In other embodiments, however, the Chat Vendor 340 may be configured to not send anything at all to the chat vendor client or Terminal 310 in the event that those customer service associates having a skill set related to the search query are not available to chat with the customer. In still other embodiments, the Chat Vendor 340 has one or more backup rules that, for example, instruct the Chat Vendor 340 to check the availability of the customer service associates having skill sets most closely related to the skill set determined to be related to the customer's search query, or to check the availability of a customer service associate with more general skills.

On the other hand, if one or more customer service associates with a skill set related to the search query are currently available to chat with the customer, the Chat Vendor 340 notifies the Terminal 310 accordingly. In FIG. 4, the Chat Vendor 340 instructs the chat vendor client to use the User Interface 318 to present the customer with a link to a chat session, as represented by block 465. In one embodiment, the link is presented to the customer on the search results page displayed by the Browser Application 316 or in a pop-up or other browser window. In other embodiments, the Chat Vendor 340 may be configured to place a link to a chat session directly in the page displayed on the Terminal 310 instead of instructing the chat vendor client to do so. Further, although the embodiment illustrated in FIG. 4 includes a link, any method of inviting the customer to open a chat session may be used. For example, in one embodiment, a pop-up or new window is opened on the Terminal's display that automatically begins the chat communicating a greeting from the customer service associate.

Once a link or other chat invitation is presented to the customer using the Terminal 310, the customer may follow the link and open the chat session with a customer service associate, as represented by block 470. In one embodiment, the chat session is text based, while in other embodiments the chat session can include video and/or audio of the customer and/or of the customer service associate. In one embodiment, the chat session comprises substantially real-time electronic communication between the customer and a customer service associate. In one embodiment, the Chat Vendor 340 runs the chat session between the customer and the customer service associate, while, in other embodiments, the Chat Vendor 340 merely facilitates opening the chat session for another communicable device or entity to run the chat session.

In a further embodiment, Chat Vendor 340 is also configured to facilitate a chat session between a customer service associate and one or more other customer service associates. For example, once Chat Vendor 340 determines that a customer service associate with the relevant skill set is available to chat, Chat Vendor 340 runs a chat session between that customer service associate and another customer service associate to discuss a customer service strategy. Then after a customer service strategy is discussed, Chat Vendor 340 runs a chat session between the customer service associate with the relevant skill set and the customer. In one embodiment, one or more chat sessions may take place substantially simultaneously, including one between the customer and a customer service associate with the relevant skill set and another between that customer service associate and one or more other customer service associates.

Also, the order of the processes described in FIGS. 3 and 4 is merely exemplary and may vary in other embodiments of the invention. For example, the Search Front End 320 may return a search result to the Terminal 310 before, after, or substantially simultaneous with the Search Front End 320 sending a chat vendor client to the Terminal 310. As another example, the Chat Vendor 340 may send to the Terminal 310 an instruction to display a link to a chat session before, after, or substantially simultaneous with the Search Front End 320 sending a search result to the Terminal 310.

Additionally, although FIGS. 3 and 4 describe particular ways of using a chat vendor client in the Terminal 310 to communicate and facilitate opening a chat session with Chat Vendor 340, other methods may be implemented. For example, the Search Front End 320 may send a chat message directly to the Chat Vendor 340, which then sends to the Terminal 310 via the Search Front End 320 an instruction to display a link to a chat session. Alternatively, the Search Front End 320 may send a chat message directly to the Chat Vendor 340, which then sends an instruction to display a link to a chat session directly to the Terminal 310.

Further, although FIG. 3 depicts the Search and Chat Integration System 300 as having a separate Terminal 310, Search Front End 320, Analysis Vendor 330, and Chat Vendor 340, this is not required. For example, some or all of these entities may be combined into a single entity, i.e. the Search Front End 320 and the Analysis Vendor 330 may be combined into a single Search and Analysis Entity configured to receive a search query, send a search result based at least partially on the search query, compare the search query to a rule, and send a chat vendor client based at least partially on the comparison of the search query to the rule. Likewise, some or all of the entities in the Search and Chat Integration System 300 may be separated into two or more distinct entities, i.e. the Chat Vendor 340 may be separated into a Chat Message Entity configured to communicate with Terminal 310, and a Chat Session Entity configured to open a chat session between the itself and Terminal 310.

In addition, the entities illustrated in FIG. 3 may be maintained by the same or separate parties. For example, a customer may maintain the Terminal 310, a bank may maintain the Search Front End 320, a third party vendor may maintain the Analysis Vendor 330, and another third party vendor may maintain the Chat Vendor 340. As another example, a bank may maintain the entire Search and Chat Integration System 300, including the Terminal 310, Search Front End 320, Analysis Vendor 330, and Chat Vendor 340. Other variations in the systems and methods described herein will be apparent to one of ordinary skill in the art in view of this disclosure.

Referring now to FIG. 5, an exemplary Browser Screen 500 is illustrated, in accordance with an embodiment of the present invention. Browser Screen 500 may be an Internet web page, an intranet web page, or some other user interface screen operatively connected with a Search and Chat Integration System. Browser Screen 500 includes Search Field 510, Search Results List 520, and Contact List 530. Search Field 510 further includes "Search" Button 512 and "Tips" Button 514. Search Results List 520 further includes Refine Search Results List 522, Top Searches List 524, and Search Results Feedback 526. Contact List 530 further includes Contact Information 532 and "Chat Link" Button 534.

Browser Screen 500 may be configured for use with any of the Search and Chat Integration Systems described herein. For example, Browser Screen 500 may be a part of Browser Application 316 in Search and Chat Integration System 300, as the means by which the customer enters search queries, receives search results, and opens chat sessions in accordance with process flow 400. For simplicity, the following describes how Browser Screen 500 interacts with the Search and Chat Integration System 300, as it implements process flow 400. This is not meant to suggest that Browser Screen 500 cannot be configured for use with other Search and Chat Integration Systems or implement other processes.

In operation, the customer enters a search query into the Search Field 510 of the Browser Screen 500 that is displayed to the customer using a display device of the User Interface 318 of the Terminal 310. If the customer has difficulty determining what search query to enter or what form the search query should take, the Search Field 510 may provide a "Tips" Button 514 that, when selected, will direct the customer to information related to these and other search field issues. Once the customer is satisfied with his or her search query, the customer selects the "Search" Button 512, as represented by block 405, which initiates the processes illustrated in FIG. 4.

After the search query is entered, the Search and Chat Integration System 300 returns a Search Results List 520 to the Browser Screen 500, as represented by block 415. This list may include, for example, links to other pages related to the search query. As illustrated in FIG. 5, the exemplary search query "checking" may return the following exemplary links related to that search query: "Checking Accounts: Overview," "Checking Accounts: Frequently Asked Questions," and "Checking Accounts: Request a Check Card." It will be understood by one of ordinary skill in the art that the type, number, and content of results in the Search Results List 520 may vary and is not limited to those particular examples described herein.

In other embodiments of the present invention, the Search Results List 520 may include several other related features. For example, the Search Results List 520 may include a Refine Search Results List tool 522, a Top Searches tool 524, and a Search Results Feedback tool 526, as illustrated in FIG. 5. In the illustrated embodiment, the Refine Search Results List tool 522 is configured to provide the customer with a series of expandable and collapsible links that shows the customer how information related to the exemplary search query "checking" is organized within the website. The Top Searches tool 524 is configured to present the customer with a list of the most frequently entered search queries by other customers, which may help the customer to refine their search query or identify another search of interest to the customer. The Search Results List 520 may also include a Search Results Feedback tool 526 to provide the customer with an opportunity to express the features that the customer likes and dislikes about the Search Results List 520 or any other feature in the Browser Screen 500. All of these features are meant to enhance the customer service experience.

In addition to returning the Search Results List 520, in the embodiment illustrated in FIG. 5, the Search and Chat Integration System 300 is also configured to return a Contact List 530 to the Browser Screen 500, as illustrated in FIG. 5. The Contact List 530 includes Contact Information 532 that provides the customer with information on how to contact a customer service associate. As illustrated in FIG. 5, the Contact Information 532 may include a customer service phone number and information related to when customer service associates may be reached.

The Search and Chat Integration System 300 is also configured to return a "Chat Link" Button 534 to the Browser 500 if a customer service associate having a skill set related to the search query is available to chat. For example, FIG. 5 shows one variation of a "Chat Link" Button 534, the presence of which indicates that a customer service associate having a skill set related to the exemplary search query "checking" is available to chat. If desired, the customer may select the "Chat Link" Button 534 and open a chat session (not pictured) with the customer service associate, as represented by block 470 of FIG. 4. On the other hand, if no customer service associate having a skill set related to the search query is available to chat, as represented by blocks 435 and 460 of FIG. 4, then the Search and Chat Integration System 300 will not return the "Chat Link" Button 534 to Browser 500. However, in such a case, the customer would still have the customer service information provided by the Contact Information 532 in the Contact List 530.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. In view of this disclosure, those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A customer service system comprising:
a communication interface comprising a financial institution's web page accessible to a customer of the financial institution and configured to receive a search query from the customer, where the search query relates to a financial product;
a storage device comprising a database comprising, at least one rule wherein the at least one rule relates at least partially to predetermined criteria for automatically displaying, on the communication interface accessible to the customer an invitation to chat with a customer service associate of the financial institution, wherein the predetermined criteria relates to whether the customer service associate is capable of answering questions about the financial product whether the customer service associate is currently available to chat with the customer; and a computer processor operatively coupled to the communication interface, and the storage device, wherein the computer processor is configured to automatically and independent of a request from the customer to chat:

analyze the search query to determine information associated with the search query;

compare the information associated with the search query to the at least one rule stored in the database;

determine whether or not to display on the communication interface accessible to the customer an invitation to initiate a chat session between the customer service associate and the customer, based at least partially on determining that the customer service associate is capable of answering questions about the financial product and that the customer service associate is currently available to chat.

2. The system of claim 1, wherein the chat session comprises substantially real-time electronic communication.

3. The system of claim 1, wherein the computer processor is further configured to initiate a search using the search query.

4. The system of claim 1, wherein the search query comprises a request to search at least a portion of the Internet.

5. A customer service system comprising:

a communication interface comprising a financial institution's web page accessible to a customer of the financial institution, wherein the communication interface is configured to receive information about a customer-initiated search query, where the search query relates to a financial product;

a memory device comprising a database comprising a list of subject matters and respective skill sets corresponding to each of two or more customer service associates of the financial institution, the database further comprising at least one rule wherein the at least one rule relates at least partially to predetermined criteria for automatically displaying on the communication interface accessible to the customer an invitation to chat with one of the two or more customer service associates of the financial institution, and wherein the predetermined criteria relates to whether the customer service associate is capable of answering questions about the financial product and whether the customer service associate is currently available to chat with the customer; and a computer processor operatively coupled to the communication interface and the memory device, wherein the computer processor is configured to automatically without a prompt from the customer to chat:

analyze the search query to determine a subject matter and information associated with the customer-initiated search query;

compare the subject matter associated with the customer-initiated query to the subject matter list and compare the information associated with the customer-initiated search query with the respective skill set stored for the two or more customer services associates to the at least one rule in the memory device;

determine that a customer service associate is skilled in the subject matter related to the customer-initiated search query based at least partially on the comparison of the subject matter associated with the customer-initiated query to the subject matter list and information associated with the customer-initiated search query with the skill set corresponding to each of the two or more customer service associates; and determine whether or not to display on the communication interface accessible to the customer an invitation to initiate a chat between the customer service associate and the customer based at least partially on determining that the customer service associate is skilled in the subject matter related to the customer-initiated search query and that the customer service associate is currently available to chat.

6. The system of claim 5, wherein the computer processor is further configured to use the communication interface to communicate information about whether there exists a customer service associate skilled in a subject matter related to the customer-initiated search query to another device.

7. The system of claim 5, wherein the memory device provides a substantially real-time representation of at least a portion of the customer service associate skill set.

8. The system of claim 5, further comprising:

a memory device operatively coupled to the computer processor and comprising a customer service associate availability.

9. The system of claim 8, wherein the memory device provides a substantially real-time representation of at least a portion of the customer service associate availability.

10. The system of claim 5, wherein the financial institution is a bank and wherein the system is maintained by the bank.

11. The system of claim 5, wherein the computer processor is configured to display the chat by communicating with a chat system configured to send an invitation to the customer to join the chat.

12. The system of claim 5, wherein the processor is configured to display the chat by sending a chat vendor client to the communication interface accessible to the customer, and wherein the chat vendor client is configured to contact a chat vendor.

13. The system of claim 5, wherein the computer processor is configured to determine that the customer service associate is skilled in the subject matter related to the customer-initiated search query by comparing the received information about the customer-initiated search query to a rule.

14. The system of claim 5, wherein the information about the customer-initiated search query comprises the customer-initiated search query.

15. The system of claim 5, wherein the information about the customer-initiated search query comprises information about the subject matter of the customer-initiated search query.

16. The system of claim 5, wherein the communication interface is configured to receive the information about the customer-initiated search query from a customer terminal associated with the communication interface, wherein the customer terminal is accessible to the customer.

17. The system of claim 5, wherein the communication interface device is configured to receive the information about the customer-initiated search query from a search front end system.

18. The system of claim 5, wherein the computer processor is further configured to initiate a search using the information received about the customer-initiated search query.

19. The system of claim 18, wherein the search comprises a search of materials on at least a portion of the internet.

20. The system of claim 18, wherein the computer processor is further configured to use the communication interface to communicate results of the search to a customer terminal, wherein the customer terminal is accessible to the customer.

21. A system for providing a customer a chat session with a customer service associate, the system comprising:
- a server configured to provide a web page of a financial institution to a customer of the financial institution, wherein the web page comprises a search field, and wherein the search field enables the customer to enter a search query, where the search query relates to a financial product;
- a storage device comprising a database comprising at least one rule wherein the at least one rule relates at least partially to predetermined criteria for automatically displaying, on the web page of the financial institution accessible to the customer an invitation to chat with a customer service associate of the financial institution, wherein the predetermined criteria relates to whether the customer service associate is capable of answering questions about the financial product and whether the customer service associate is currently available to chat with the customer; and
- a computer processing device operatively connected to the server and the storage device, wherein the computer processing device is configured to automatically independent of a request from the customer to chat:
  receive the search query entered by the customer;
  analyze the search query to determine information associated with the search query;
  determine the subject matter of the search query entered by the customer;
  compare the information associated with the search query to at the at least one rule in the database;
  determine whether or not to display on the web page of the financial institution accessible to the customer an invitation to chat with a particular customer service associate, wherein the computer processing device displays the invitation based on determining that the customer service associate is capable of answering questions about the financial product and that the customer service associate is currently available to chat.

22. A method of directing a customer of a bank to a chat session with a customer service associate of the bank, the method comprising:
- receiving a search query from the customer via a computer apparatus comprising a communication interface, where the search query relates to a financial product;
- providing a memory device of a computer apparatus, wherein the memory device comprises information, wherein the information comprises at least one rule, wherein the information stored in the memory device relates at least partially to predetermined criteria for automatically presenting on the communication interface accessible to the customer a path to a chat session with a customer service associate of the bank, wherein the predetermined criteria relates to whether the customer service associate is capable of answering questions about the financial product and whether the customer service associate is currently available to chat with the customer;
- using the computer apparatus to automatically independent of a request from the customer to chat:
  analyze the search query to determine information associated with the search query;
  compare the information associated with the search query to the at least one rule stored in the memory device;
  determine whether or not to present on the communication interface accessible to the customer a path to the chat session based at least partially on determining that the customer service associate is capable of answering questions about the financial product and that the customer service associate is currently available to chat.

23. The method of claim 22, further comprising: returning a search result to the customer using the computer apparatus, the search result comprising information related to the search query.

24. The method of claim 22, further comprising:
performing a search using a computer apparatus, the search comprising a search for information related to the search query.

25. The method of claim 22, wherein the chat session comprises substantially real-time communication between the customer and the customer service associate.

26. A computer program product for providing customer service, the computer program product comprising a non-transitory computer-readable storage medium, wherein the non-transitory computer-readable medium comprises one or more computer-readable program code portions that, when executed by a computer, cause the computer to:
- receive a search query from a customer of a bank, where the search query relates to a financial product;
- providing at least one rule, wherein the at least one rule relates at least partially to predetermined criteria for automatically displaying on a communication interface accessible to the customer an invitation to chat with a customer service associate of the financial institution, wherein the predetermined criteria relates to whether the customer service associate is capable of answering questions about the financial product and whether the customer service associate is currently available to chat with the customer;
- return a search result to the customer based at least partially on the search query;
- analyze the search query to determine information associated with the search query;
- compare the information associated with the search query to the at least one rule; and
- automatically independent of a request from the customer to chat, determine whether or not to display on the communication interface accessible to the customer the invitation to a chat session between the customer and the customer service associate, based at least partially on determining that the customer service associate is capable of answering questions about the financial product and that the customer service associate is currently available to chat.

27. The computer program product of claim 26, wherein the rule is based at least partially on whether a subject matter of the search query at least partially relates to a skill set of a customer service associate.

* * * * *